Nov. 7, 1967   B. L. FROST ET AL   3,350,951
TRANSMISSION
Filed Dec. 6, 1965   3 Sheets-Sheet 1

FIG. I

INVENTORS
BARRY L. FROST
BURTON S. ZELLER
BY Robert H. Johnson
ATTORNEY

INVENTORS
BARRY L. FROST
BURTON S. ZELLER
BY
ATTORNEY

Nov. 7, 1967

B. L. FROST ET AL 3,350,951

TRANSMISSION

Filed Dec. 6, 1965

INVENTORS
BARRY L. FROST
BURTON S. ZELLER
BY *Robert H. Johnson*
ATTORNEY

United States Patent Office 3,350,951
Patented Nov. 7, 1967

3,350,951
TRANSMISSION
Barry L. Frost, Jackson, and Burton S. Zeller, Parma, Mich., assignors to Clark Equipment Company, a corporation of Michigan
Filed Dec. 6, 1965, Ser. No. 511,799
5 Claims. (Cl. 74—360)

This invention relates to a change speed power transmission mechanism, and more particularly to such transmission mechanisms having constantly meshing gears plus clutches for selectively clutching such gears to rotatable shafts to provide the desired gear ratio between the input and output shafts of the transmission.

The present transmission is power-shifted and is intended primarily for use in the propulsion of heavy duty vehicles, but it will be apparent that it is not limited to such use and may be adapted for the transmission of power in other applications.

An object of our invention is to provide a compact and rugged multispeed transmission having a plurality of forward speed ratios and at least one reverse speed ratio.

Another object of our invention is to provide a multi-speed transmission having two reverse speeds which are substantially the same as the two lowest forward speeds.

A further object of our invention is to provide a transmission having a forward speed ratio gear which also serves as an idler gear for the reverse drive train.

In carrying out our invention in a preferred embodiment we provide a multiratio constant mesh gear transmission having a plurality of rotatable shafts journaled in a casing disposed in substantially parallel relation. The shafts include an input shaft, a power take-off or alternate input shaft, an output shaft, a pair of idler shafts, and three countershafts, two of the countershafts being telescoped relative to each other. The input shaft and power take-off shaft each have a gear mounted for rotation thereon at one end thereof and a clutch for connecting the gear to the shaft for conjoint rotation. Both the input and power take-off shafts have a gear fixed thereto and both gears mesh with a gear carried on one of the idler shafts so that the input and power take-off shafts are drivingly connected together at all times. The gears mounted for rotation on the input and power take-off shafts mesh with a power input gear rotatably mounted on the output shaft. One of the counter shafts has a gear mounted for rotation thereon at each end thereof and a clutch associated with each gear for connecting the gear to the shaft for conjoint rotation. The gear on one end of this countershaft meshes with the power input gear and also meshes with a gear fixed to the other idler shaft. Another gear is fixed to the other end of the second-mentioned idler shaft and meshes with the gear on the other end of the countershaft. There is a gear mounted for rotation on the outer end of each telescoped countershaft, one of the gears meshing with the gear fixed to one end of the second-mentioned idler shaft and the gear on the other telescoped countershaft meshing with the gear on the same end of the countershaft mentioned first. There is a gear fixed to each telescoped countershaft, each of these gears meshing with a different gear fixed to the output shaft. A gear is fixed to the first-mentioned countershaft and meshes with one of the two gears fixed to the output shaft.

In a modification of our invention the power take-off or alternate input shaft is eliminated and the input shaft merely has a gear fixed thereto which meshes with the power input gear rotatably mounted on the output shaft of the first-mentioned embodiment.

In a second modification of our invention both the input and power take-off or alternate input shafts of the first-mentioned embodiment are eliminated, together with the gear rotatably mounted on the output shaft, and the idler shaft with the pair of gears fixed thereto is extended to receive a coupling and used as the input shaft.

The above other objects, features and advantages of our invention will be more clearly understood when reference is made to the following detailed description and the accompanying drawings herein:

Figure 1:
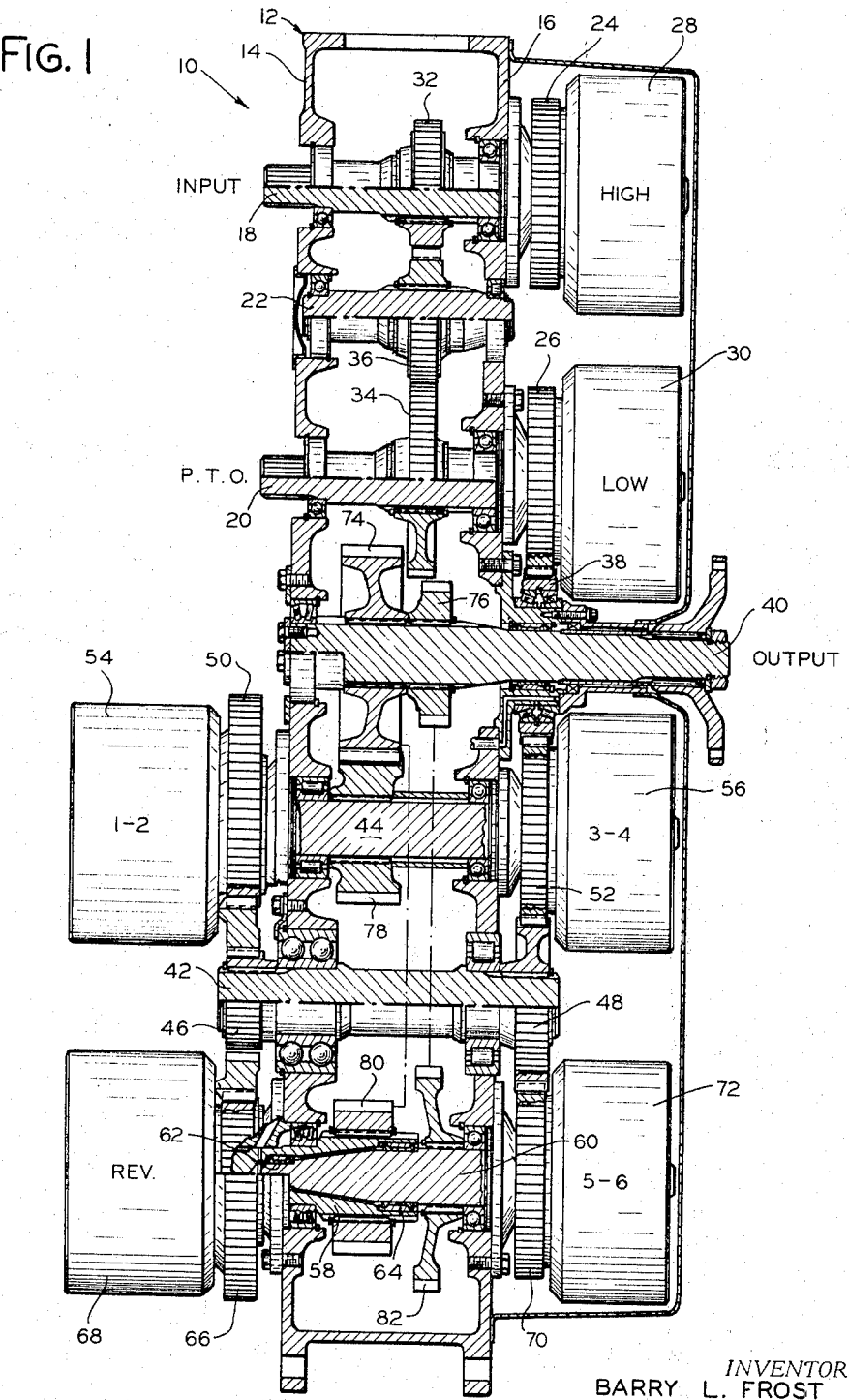
FIGURE 1 is a cross-section of a preferred embodiment of our invention.
Figure 2:
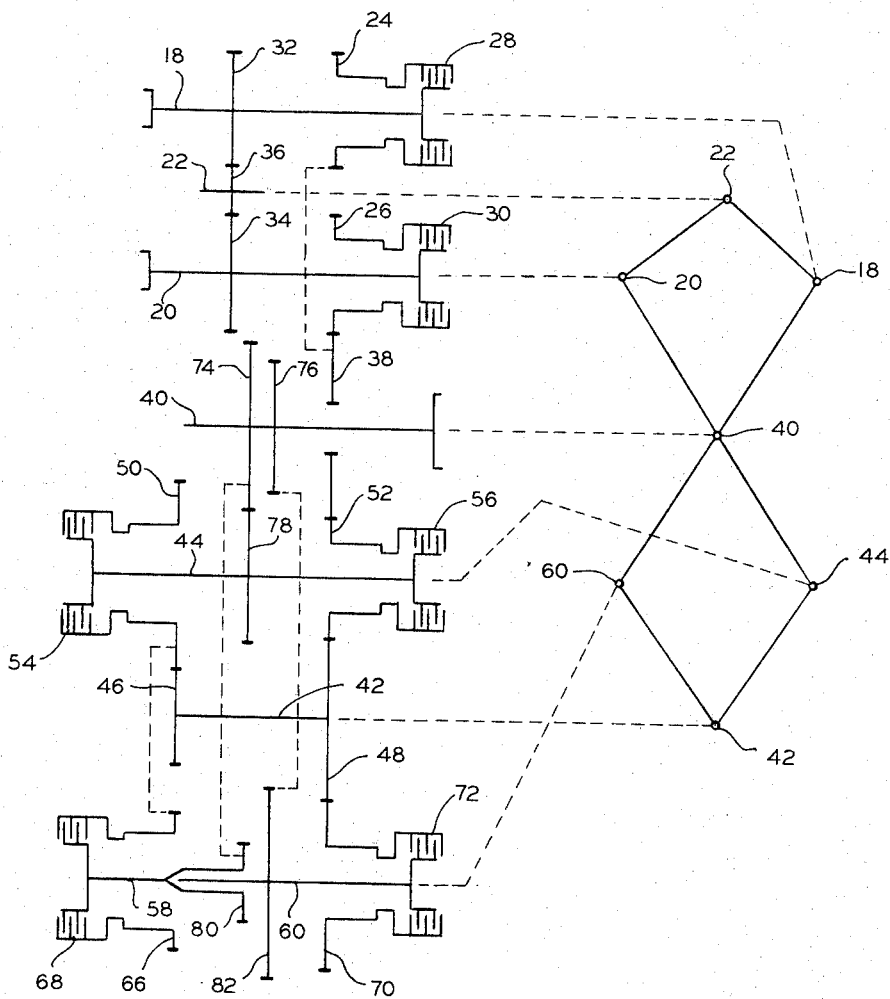
FIGURE 2 is a two-part diagrammatic representation of the transmission shown in FIG. 1, having a developed schematic diagram on the left in which the gears, shafts and clutches are shown with the shaft centers in one plane and on the right a diagram which shows the actual positions, as viewed from one end, of the centers of the shafts.

Referring to FIGS. 1 and 2, the reference numeral 10 denotes generally a multirange constant mesh gear transmission which includes a casing 12 with a pair of substantially parallel end walls 14 and 16 in which a plurality of substantially parallel shafts are journaled for rotation.

The shafts include an input shaft 18, an alternate input or power take-off shaft 20 and a first idler shaft 22. These three shafts are all supported by end walls 14 and 16 and mounted in suitable bearings for rotation. The ends of both shafts 18 and 20 extend beyond end walls 14 and 16, one of the ends of each of shafts 18 and 20 being suitably splined to accept couplings for connecting one of the shafts to an engine input and the other shaft to a power-take-off driven device, if desired. The other ends of shafts 18 and 20 have a pair of gears 24 and 26, respectively, mounted for rotation thereon. Associated with shaft 18 and gear 24 is a conventional multiple disc fluid actuated clutch 28 which is effective when engaged to connect gear 24 to shaft 18 for conjoint rotation therewith. For a more detailed description of a suitable clutch of this type see U.S. Patent 3,126,752 granted March 31, 1964, in the name of R. H. Bolster. Similarly, a clutch 30 is associated with shaft 20 and gear 26 for connecting the gear 26 to shaft 20 for conjoint rotation therewith. A gear 32 is fixed to shaft 18 for conjoint rotation and disposed between end walls 14 and 16 and another gear 34 is fixed to shaft 20 for conjoint rotation therewith and likewise disposed between walls 14 and 16. Gears 32 and 34 mesh with another gear 36 which is fixed to idler shaft 22. Both gears 24 and 26 mesh with a power input gear 38 which is mounted for rotation on a shaft 40 which serves as the power output shaft of transmission 10.

At this point it will be seen that power input gear 38 may be driven alternatively by gears 24 and 26, depending upon whether clutch 28 or 30 is engaged since rotation of either shaft 18 or 20 causes rotation of other shaft due to gears 32 and 34 being fixed to the shafts and meshing with idler gear 36.

Because of the difference in the number of teeth on the above-mentioned gears mounted on shafts 18, 20 and 22, the gear 38 is driven at two different speeds for a given r.p.m. of shaft 18 depending upon whether clutch 28 or clutch 30 is engaged. Clearly, shafts 18, 20 and 22 and the gears and clutches mounted thereon serve as a dual range or splitter portion of transmission 10. The teeth on these gears are chosen so that when gear 26 is driving gear 38, gear 38 will be driven at a lower r.p.m. than is the case when gear 24 is driving gear 38. Thus, clutch 28 may be termed the high range clutch and clutch 30 termed the low range clutch.

In addition to the above-mentioned shafts, an idler shaft 42 and a countershaft 44 extend through end walls 14 and 16 and are mounted for rotation in suitable bearings therein. Fixed to idler shaft 42 outwardly of end walls 14 and 16 is a pair of gears 46 and 48. A pair of gears 50 and 52 are mounted for rotation on countershaft 44 outwardly of end walls 14 and 16, respectively. It will be noted that gears 46 and 50 mesh with each other while gears 48 and 52 mesh with each other. A clutch 54 is associated with countershaft 44 and gear 50 and serves, when engaged, to connect gear 50 to shaft 44 for conjoint rotation therewith. Likewise, a clutch 56 is associated with gear 52 and countershaft 44 so that it serves, when engaged, to connect gear 52 to countershaft 44 for conjoint rotation therewith.

A pair of countershafts 58 and 60 extend through end walls 14 and 16 respectively, and are mounted for rotation therein by suitable bearings. Countershaft 58 is a sleeve shaft and has countershaft 60 partially telescoped therein and journaled in bearings 62 and 64.

Mounted for rotation on countershaft 58 outwardly of end wall 14 is a gear 66. A clutch 68 is associated with countershaft 58 and gear 66 so that it serves, when engaged, to connect gear 66 to countershaft 58 for conjoint rotation therewith. A gear 70 is mounted for rotation on countershaft 60 outwardly of end wall 16. A clutch 72 is associated with countershaft 60 and gear 70 and serves, when engaged, to connect gear 70 to countershaft 60 for conjoint rotation therewith. Gear 70, it will be noted, meshes with gear 48 while gear 66 meshes with gear 50 with the result that gears 66 and 70 turn in opposite directions at all times.

Power is transmitted to output shaft 40 either through a gear 74 or a gear 76, both of which are splined to output shaft 40. Gear 74 meshes with a gear 78 splined to countershaft 44 and a gear 80 which is splined to countershaft 58. Gear 76 meshes with a gear 82 which is splined to countershaft 60.

In order to enable persons skilled in the art to better understand our invention we will explain the operation of it. It will be assumed that input shaft 18 is connected to a source of power such as an internal combustion engine and that initially all of the transmission clutches are in their disengaged conditions which is the neutral condition of the transmission as no power will be transmitted to the output shaft. Now, we will assume that it is desired to connect the output shaft to the input shaft at the lowest forward speed ratio and progress to the highest forward speed ratio. In order to drive output shaft 40 at the lowest speed ratio low range clutch 30 and speed ratio clutch 54 are engaged. This provides the first speed ratio. In order to condition the transmission for the second speed ratio clutch 54 is maintained engaged while clutch 30 is disengaged and clutch 28 is engaged. This provides the second speed ratio. The third speed ratio is achieved by disengaging clutches 54 and 28 and engaging clutches 56 and 30. By maintaining clutch 56 engaged while disengaging clutch 30 and engaging clutch 28 the transmission is conditioned for fourth speed ratio. In order to engage the transmission for fifth speed ratio clutches 56 and 28 are disengaged and clutches 72 and 30 are engaged. Sixth speed is accomplished by maintaining engagement of clutch 72 while engaging clutch 28 and disengaging clutch 30.

In order to condition transmission 10 for reverse drive clutch 68 is engaged. A first reverse speed ratio may then be obtained by engaging clutch 30 while a higher speed reverse may be obtained by engaging clutch 28 rather than clutch 30.

To provide a concrete example of one transmission design in accordance with this invention, we are listing below each of the gears of the design shown in FIGS. 1 and 2 and the number of teeth employed for each gear.

| Gear: | Number of teeth |
|---|---|
| 24 | 42 |
| 26 | 42 |
| 32 | 30 |
| 34 | 46 |
| 36 | 30 |
| 38 | 38 |
| 46 | 22 |
| 48 | 38 |
| 50 | 59 |
| 52 | 42 |
| 66 | 55 |
| 70 | 42 |
| 74 | 40 |
| 76 | 26 |
| 78 | 27 |
| 80 | 27 |
| 82 | 41 |

The foregoing combination of gears provides the following gear reductions in each of the six forward speed ratios:

| Ratio— | |
|---|---|
| 1 | 5.512 |
| 2 | 3.595 |
| 3 | 2.272 |
| 4 | 1.481 |
| 5 | .972 |
| 6 | .634 |

And the following gear reductions in each of the two reverse ratios:

| Ratio— | |
|---|---|
| 1 | 5.14 |
| 2 | 3.35 |

From the foregoing description it will be appreciated that our invention provides a compact transmission having six forward speed ratios and two reverse speed ratios, the reverse speed ratios being substantially the same as the first two forward speed ratios.

Figure 3:
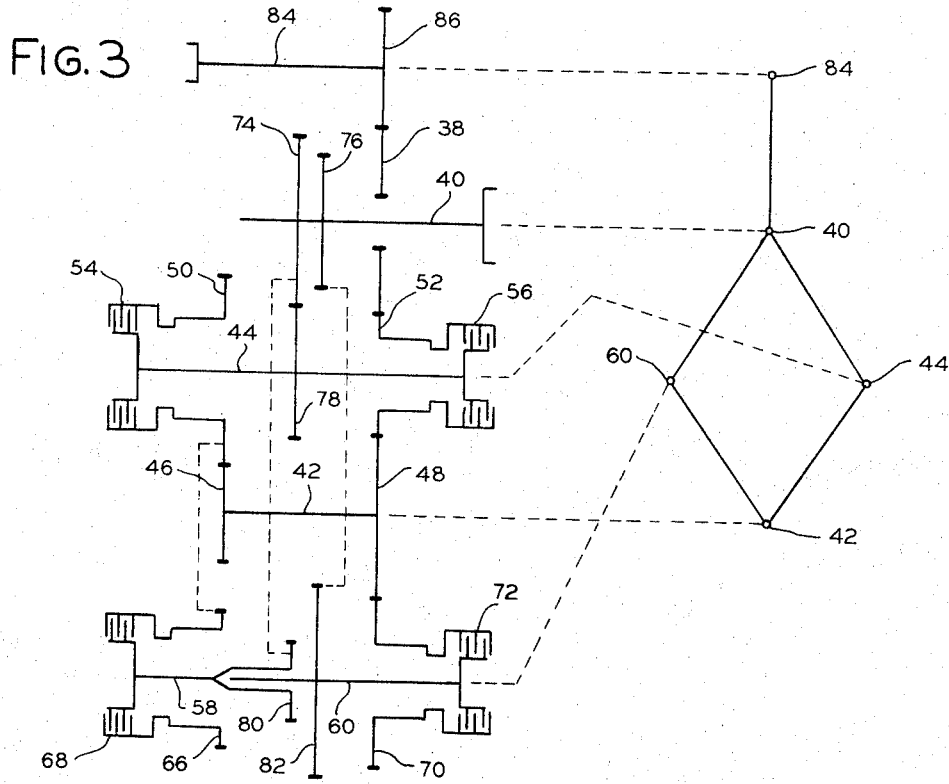
FIGURE 3 is a diagrammatic figure similar to FIG. 2, except showing a modification of our invention.

Turning now to FIG. 3, there is shown a modification of our invention wherein the dual range or splitter portion of the previously described embodiment is replaced by an input shaft 84 to which a gear 86 is fixed, gear 86 meshing with power input gear 38. The remainder of this modification is the same as the above-described embodiment and so reference is made here to the above description, like reference numerals being applied to like parts.

This modification provides a compact constant mesh power-shifted transmission which has three forward speed ratios and a reverse speed ratio which is substantially the same as the first forward speed ratio.

Figure 4:
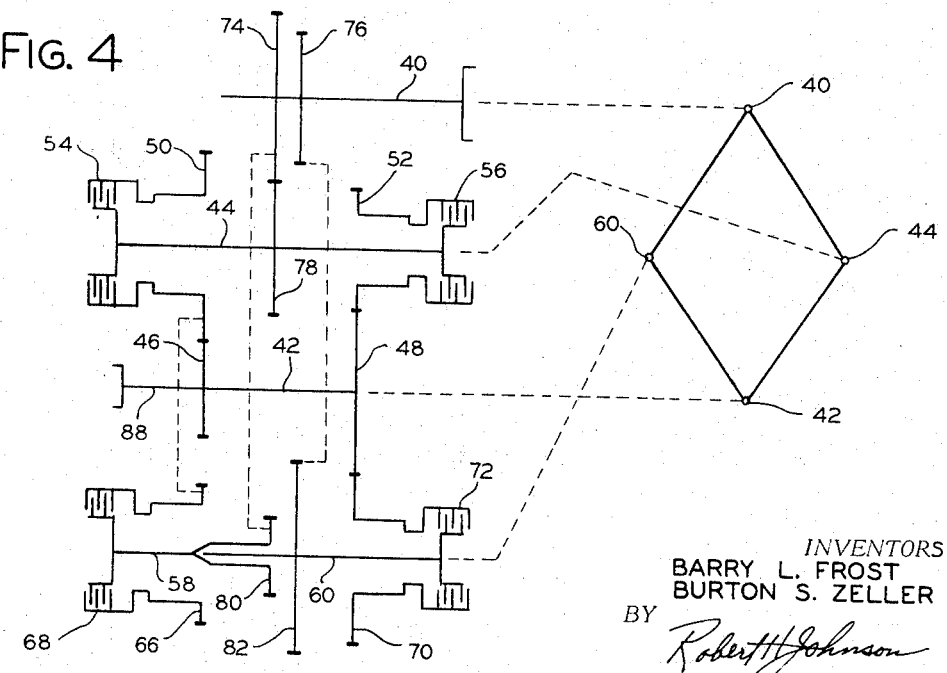
FIGURE 4 is again a diagrammatic figure similar to FIG. 2 except showing still another modification of our invention.

Referring to FIG. 4, there is shown another modification of our invention which differs basically from the embodiment shown in FIGS. 1 and 2 in that the splitter portion of the transmission has been removed so that the transmission provides only three forward speed ratios and a single reverse speed ratio. This modification differs from the modification shown in FIG. 3 in that idler shaft 42 is replaced by a shaft 88 which serves as the power input shaft, the remainder of the transmission otherwise being the same as the embodiment shown in FIGS. 1 and 2, reference being therefore made to the above description in this regard, like reference numerals being applied to like parts.

The operation of the modifications shown in FIGS. 3 and 4 is similar to the operation of the embodiment shown in FIGS. 1 and 2, except that now it is necessary only to engage a single clutch for whichever speed ratio that is desired.

The above-detailed description of a preferred embodiment and two modifications of our invention is intended to be illustrative only since various modifications,

We claim:
1. A transmission comprising:
 (a) first, second, third, fourth and fifth rotatable shafts,
  (1) the said shafts being disposed to be substantially parallel to each other,
 (b) first and second gears connected to the said first shaft for conjoint rotation therewith,
 (c) third and fourth gears mounted for rotation on the said second shaft,
  (1) the said third and fourth gears meshing with the said first and second gears, respectively,
 (d) first and second clutches for connecting the said third and fourth gears, respectively, to the said second shaft for conjoint rotation therewith,
 (e) a fifth gear connected to the said second shaft for conjoint rotation therewith,
 (f) a sixth gear connected to the said third shaft for conjoint rotation therewith,
 (g) a seventh gear mounted for rotation on the said third shaft,
  (1) the said seventh gear meshing with the said third gear,
 (h) a third clutch for connecting the said seventh gear to the said third shaft for conjoint rotation therewith,
 (i) an eighth gear connected to the said fourth shaft for conjoint rotation therewith,
 (j) a ninth gear mounted for rotation on the said fourth shaft,
  (1) the said ninth gear meshing with the said second gear,
 (k) a fourth clutch for connecting the said ninth gear to the said fourth shaft for conjoint rotation therewith, and
 (l) tenth and eleventh gears connected to the said fifth shaft for conjoint rotation therewith,
  (1) the said tenth gear meshing with the said fifth and sixth gears and
  (2) the said eleventh gear meshing with the said eighth gear.

2. A transmission as set forth in claim 1 wherein the said third and fourth shafts are partially telescoped relative to each other.

3. A transmission as set forth in claim 2 wherein the said fifth shaft is the power output shaft.

4. A transmission as set forth in claim 3 and including power input means, the said power input means including a power input shaft, a power input gear meshing with the said fourth gear and means for connecting the said power input gear to the said power input shaft to rotate at a first speed relative to each other or a second speed relative to each other.

5. A transmission as set forth in claim 4 wherein the said power input gear is mounted for rotation on the said power output shaft.

References Cited
UNITED STATES PATENTS

| | | |
|---|---|---|
| Re. 25,458 | 10/1963 | Barth et al. |
| 2,553,376 | 5/1951 | LeTourneau. |
| 3,064,488 | 11/1962 | Lee et al. |
| 3,073,423 | 1/1963 | Lee et al. |
| 3,126,752 | 3/1964 | Bolster. |
| 3,273,415 | 9/1966 | Frost _____ 74—360 |

DONLEY J. STOCKING, *Primary Examiner.*

H. S. LAYTON, *Assistant Examiner.*